United States Patent [19]

Naddeo et al.

[11] Patent Number: 5,338,401
[45] Date of Patent: * Aug. 16, 1994

[54] OXYGEN DETACKIFICATION IN SECONDARY FIBER RECOVERY

[75] Inventors: Ronald C. Naddeo, Kempton; Konstantinos Hristofas, Allentown; Vincent L. Magnotta, Wescosville, all of Pa.

[73] Assignee: Air Products and Chemicals, Inc., Allentown, Pa.

[ * ] Notice: The portion of the term of this patent subsequent to May 25, 2010 has been disclaimed.

[21] Appl. No.: 25,491

[22] Filed: Mar. 3, 1993

Related U.S. Application Data

[63] Continuation of Ser. No. 703,549, May 21, 1991, Pat. No. 5,213,661.

[51] Int. Cl.$^5$ .................. D21C 5/02; D21C 9/147
[52] U.S. Cl. ................................................ 162/6
[58] Field of Search ............ 162/6, 7, 8, 65, 48, 162/199, DIG. 4

[56] References Cited

U.S. PATENT DOCUMENTS

| | | | |
|---|---|---|---|
| 4,416,727 | 11/1983 | Elton et al. | 162/6 |
| 4,710,267 | 12/1987 | Elsby et al. | 162/5 |
| 4,886,575 | 12/1989 | Moreland | 162/5 |

OTHER PUBLICATIONS

Casey "Pulp and Paper Chemistry & Chemical Technology" vol. III 1981 pp. 1614–1617.
Ruvo, et al; "Upgrading of Pulp from Corrugated Containers by Oxygen Delignification"; Tappi Journal; Jun. 1986.
Miller, P. C.; "Chemical Treatment Programs for Stickies Control"; 1988 Pulping Conference.
Markham, et al; "Oxygen Bleaching of Secondary Fiber Grades"; Tappi Journal; Dec. 1988.

*Primary Examiner*—Karen M. Hastings
*Attorney, Agent, or Firm*—John M. Fernbacher; James C. Simmons; William F. Marsh

[57] ABSTRACT

A method is disclosed for the detackification of stickies in the production of recycled paper products containing secondary fibers. Oxygen is used to reduce the tackiness of stickies in secondary pulps, and optionally is used with alkali and/or detackification agents for optimum stickies control.

12 Claims, No Drawings

OXYGEN DETACKIFICATION IN SECONDARY FIBER RECOVERY

This is a continuation of application Ser. No. 07/703,549 filed on May 21, 1991, now U.S. Pat. No. 5,213,661.

FIELD OF THE INVENTION

This invention pertains to the recovery of secondary fibers from waste paper, and In particular to the detackification of tacky contaminants in waste paper furnish.

BACKGROUND OF THE INVENTION

Secondary fibers recovered from waste paper are converted into a wide variety of recycled paper products. Waste paper materials often contain varying amounts of troublesome sticky or tacky contaminants including adhesives, binders, coatings, certain types of inks, and the like. These tacky contaminants, usually referred to as "stickies", accumulate and cause operational problems in the various pieces of process equipment used to screen and clean the pulp, form paper sheet, and handle paper sheet products. The presence of these tacky contaminants or stickies also can affect adversely the quality of the final paper products. The growing utilization of secondary fibers in many types of paper products has made it necessary for paper manufacturers to process lower grades of waste paper. Such lower grade furnish is more heterogeneous and typically contains more stickies than a preferred higher quality waste paper.

Economical manufacture of paper products using secondary fibers thus requires effective methods for treating secondary pulps to detackify and/or remove stickies (usually referred to as "detackification"). Known methods for removing or reducing the tackiness of stickies typically involve the addition of materials similar to those used to control pitch deposition in papermaking with virgin pulp. Such materials, defined herein as detackification agents, include surfactants, water-soluble polymers, and other ionic water-soluble compounds, as well as inorganic materials such as talc, diatomaceous earth, clays, and the like. These materials act to modify the surfaces of the dispersed particles of tacky compounds to remove the contact adhesive properties of the particles and thereby render them less troublesome and more easily removed. U.S. Pat. No. 4,710,267 discloses the use of surface-active tertiary amines or quaternary ammonium compounds for reducing discoloration and tackiness in waste paper pulps. U.S. Pat. No. 4,886,575 discloses the application of polyvinyl alcohol having various molecular weights for detackification of waste paper pulps. P. C. Miller, in a paper entitled "Chemical Treatment Programs for Stickies Control" in *TAPPI Proceedings*, 1988 Pulping Conference, pp. 345-348, reviews the stickies problem and describes a number of approaches to detackification by chemical addition to secondary pulps.

Oxygen treating or delignification of secondary pulp is known but generally has not been utilized to address the problem of stickies. U.S. Pat. No. 4,416,727 discloses a process for recovering and maintaining the brightness of fibers from wet-strength resin-coated waste paper furnish by pulping the furnish in an alkaline solution and contacting the pulp with oxygen to dissolve the polymeric wet-strength resins followed by recovery of the acceptable fibers in a washing step. An article by A. De Ruvo et al entitled "Upgrading of Pulp from Corrugated Containers by Oxygen Delignification" in *Tappi Journal*, June 1986, pp. 100-103 describes a process for upgrading recycled fibers by oxygen delignification to give the fiber a more virgin-like character by fiber swelling and softening resulting from lignin removal. The problem of stickies was identified but the removal of such stickies was not addressed. In an article entitled "Oxygen Bleaching of Secondary Fiber Grades" published in *Tappi Journal*, December 1988, pp. 168-174, L. D. Markham et al describe an oxygen bleaching process effective for removing most types of dirt and improving the brightness and bleachability of recycled pulps. The effect of the oxygen bleaching process on stickies was investigated and it was concluded that stickies were not well removed or dispersed in the oxygen stage.

The need for improved and more economical methods for detackification of pulps in secondary fiber recovery led to the present invention as disclosed and claimed below.

SUMMARY OF THE INVENTION

The present invention is a method for treating a secondary pulp comprising cellulosic fibers and tacky contaminants, wherein the pulp is prepared from waste paper material. The method comprises contacting the pulp with an oxygen-containing gas at conditions of temperature, oxygen partial pressure, and contact time sufficient to decrease the tackiness of the tacky contaminants, thereby reducing operating and product quality problems caused by the tacky contaminants during further processing of the cellulosic fibers to yield a recycled paper product. An alternate embodiment of the invention further comprises the addition of one or more alkaline compounds to the pulp. These alkaline compounds are selected from the group consisting of sodium hydroxide, sodium sulfide, sodium carbonate, sodium hydrosulfide, ammonium hydroxide, sodium thiosulfate, sodium sulfate, and mixtures thereof. Certain of these alkaline compounds can be obtained by the use of white liquor (an aqueous solution containing sodium hydroxide and sodium sulfide), oxidized white liquor (an aqueous solution containing sodium thiosulfate and/or sodium sulfate), or green liquor (an aqueous solution containing sodium sulfide and sodium carbonate) during contacting of the pulp with oxygen. A third embodiment comprises the addition of one or more detackification agents to the pulp following contacting with an oxygen-containing gas, wherein the detackification agents are selected from the group consisting of ethoxylated surfactants, polyvinyl alcohol (PVOH), acetylenic surfactants, ionic surfactants, talc, clay, and mixtures thereof. An extension of this third embodiment comprises the addition of one or more alkaline compounds to the pulp in addition to the contacting with an oxygen-containing gas and one or more detackification agents. These alkaline compounds are selected from the group consisting of sodium hydroxide, sodium sulfide, sodium carbonate, sodium hydrosulfide, ammonium hydroxide, sodium thiosulfate, sodium sulfate, and mixtures thereof. Certain of these alkaline compounds can be obtained by the use of white liquor (an aqueous solution containing sodium hydroxide and sodium sulfide), oxidized white liquor (an aqueous solution containing sodium thiosulfate and/or sodium sulfate), or green liquor (an aqueous solution containing sodium sulfide and sodium carbonate) during contacting of the pulp with oxygen.

The invention also includes a low-grade recycled paper product made from waste paper materials containing tacky contaminants by a method comprising (a) comminuting the waste paper with water to form a pulp comprising cellulosic fibers and tacky contaminants; (b) contacting the pulp with an oxygen-containing gas at conditions of temperature, oxygen partial pressure, and contact time sufficient to decrease the tackiness of the tacky contaminants; and (c) processing the resulting pulp of cellulosic fibers from step (b) in one or more steps selected from the group consisting of pulping, screening, and papermaking to yield the low-grade recycled paper product. Optionally, one or more detackification agents can be added to the pulp during or following the contacting with oxygen.

The invention further includes a high-grade recycled paper product made from waste paper materials containing tacky contaminants by a method comprising (a) comminuting the waste paper with water to form a pulp comprising cellulosic fibers and tacky contaminants; (b) contacting the pulp with an oxygen-containing gas and one or more alkaline compounds at conditions of temperature, oxygen partial pressure, and contact time sufficient to decrease the tackiness of the tacky contaminants; and (c) processing the resulting pulp of cellulosic fibers from step (b) in one or more steps selected from the group consisting of pulping, screening, dispersing, washing, flotation, bleaching, and papermaking to yield the high-grade recycled paper product. Optionally, one or more detackification agents can be added to the pulp during or following the contacting with oxygen.

DETAILED DESCRIPTION OF THE INVENTION

The present invention is a method for the detackification of stickies in the processing of waste paper material to produce recycled paper products. Waste paper material includes both pre-consumer and post-consumer waste papers. Pre-consumer waste includes paper mill broke and sorted waste papers according to ISRI (Institute of Scrap Recycling Industries) scrap specifications; post-consumer waste includes office paper waste, curbside paper waste, news, magazines, and especially mixtures of these types of waste paper. A secondary pulp is a pulp made from such waste paper material. Stickies, also described as tacky contaminants, result from a number of precursor materials defined herein as including but not limited to pressure-sensitive adhesives, laser-printed inks, pitch, glue, hot melts, xerox inks, and latex. In existing plants for the recovery, cleaning, and bleaching of secondary fibers, different types of waste paper materials are segregated according to type (ledger, newspaper, cardboard, etc.) and are blended in specific ratios and pulped in a pulping apparatus such as a Hydrapulper. The pulp or furnish is subjected to one or more of the following steps depending upon the source of the furnish and the specific desired end product: screening, cleaning, deinking, bleaching, and washing. The treated pulp is then sent to the appropriate type of papermaking machine to form a final recycled paper product. Careful segregation of waste paper types yields a desirable high-quality furnish with reasonably consistent properties which is readily processed. Such higher-quality furnish contains varying amounts of stickies which must be detackified and removed to certain degrees depending upon the specific types of equipment used and the required properties of the final paper product. As the demand for secondary fiber increases, the supply of high-quality wastepaper is becoming insufficient and must be supplemented by lower-quality wastepaper materials. These lower-quality materials are generally more variable in properties than the more desirable higher-quality grades of wastepaper, and more importantly, typically contain higher amounts of stickies. As the use of stickies precursors (particularly contact adhesives) in paper products increases, and as the use of lower quality furnishes becomes necessary, the degree of operational problems caused by stickies in secondary fiber mills will become more severe. Thus improved and more economical methods of detackification will be needed to ensure the efficient production of paper products from secondary fibers.

The present invention defines several new process options for the detackification of secondary pulps. Specific options can be chosen to yield the degree of detackification required for specific combinations of pulp processing equipment and specifications of final paper product. The degree of detackification selected is a balance between the cost of detackification and the cost of downtime to remove accumulated stickies from pulp processing equipment.

It has been discovered in the present invention that contacting tacky adhesive materials, which form stickies, with an aqueous liquid in the presence of oxygen will reduce the tackiness of such materials to a significant degree. The contacting step can be carried out at ambient temperature, or at elevated temperatures as desired. Alternately, the combination of oxygen and an alkaline aqueous liquid in contact with the tacky material will reduce tackiness still further. In this option, caustic (sodium hydroxide) is a satisfactory alkali, and it has been discovered that oxidized white liquor is unexpectedly even more effective as a source of alkaline material for detackification with oxygen in an alkaline solution. Fully oxidized white liquor (a sodium sulfate solution) was found to be more effective than partially oxidized white liquor (a solution of sodium sulfate and thiosulfate) as a source of alkali for this purpose. An alternate alkali source is green liquor, which is an aqueous solution containing sodium sulfide and sodium carbonate. Other alkaline compounds which can be used include sodium hydrosulfide and ammonium hydroxide. Tackiness can be reduced further if a detackification agent is used in combination with the treatment using a heated aqueous liquid and oxygen. Tackiness can be reduced still further if the aqueous liquid is alkaline, and particularly if the alkalinity is provided by oxidized white liquor.

In a typical secondary fiber recovery operation, waste paper materials are selectively blended and pulped in water in a disintegration or comminution device such as a Hydrapulper. This raw secondary fiber pulp or furnish is then subjected to additional steps such as screening, cleaning, flotation, deinking, and bleaching in various sequences and combinations to yield a clean secondary fiber pulp which is converted into a selected paper product as is known in the art. The number of additional steps by which the raw pulp is treated will depend on the source of the waste paper material as well as the type and quality of the final paper product. Clean, well-segregated wastepaper will require fewer processing steps than lower quality wastepaper containing more dirt and high-lignin materials such as old corrugated containers, newsprint, and the like. High brightness or high quality paper products, defined as tissue, towel, printing paper, and writing paper, require higher degrees of screening and bleaching than products such as cardboard, tubestock, linerboard, and the like in which certain amounts of impurities are acceptable. As earlier discussed, stickies will be present in the waste paper in varying amounts. It is necessary to detackify and in most cases remove these stickies from the secondary fibers before proceeding through additional steps including the final papermaking step. The required degree of detackification and degree of removal of the detackified stickies will depend on the specific process steps and the type of final paper product.

The present invention includes a number of embodiments which can be utilized to detackify stickies in any type of secondary fiber recovery sequence. In many instances, it will be desirable to detackify at the front end of the plant in or following the pulping step. In the first embodiment of the invention, the raw pulp is detackifted by heating the pulp to between about 25° and 250° C., preferably between about 60° and 130° C., and contacting the pulp with oxygen at a partial pressure between about 5 and 450 psig, preferably between about 20 and 100 psig, while mixing. Oxygen can be supplied by an oxygen-containing gas such as air, oxygen-enriched air, or high-purity oxygen containing between about 95 and 99.5 vol % oxygen. Typically this step will be continued for between about 0.1 and 120 minutes, preferably between about 5 and 40 minutes, to yield the required degree of detackification. While the mechanism of detackification by oxygen is not fully understood, it is believed that the stickies are hardened by chemical oxidation thus rendering the individual particles less prone to agglomerate and/or accumulate on the surfaces of plant equipment. This hardening also makes it less likely that particles will be retackified by shear in further pulp processing steps, in contrast with the use of detackification agents earlier described which only affect the surfaces of the sticky particles. In cases where a high degree of removal of completely detackified stickies is not necessary, such as in the production of corrugated medium, inner plys of cardboard, and boxboard, minimum further processing will be required before forming the final product. In most cases, however, the detackified stickies will be removed with other impurities in screening, centrifuging, flotation, and other physical contaminant removal steps.

In a second embodiment of the invention, one or more alkaline compounds are added to the pulp before, during, or after the oxygen treatment of the first embodiment. The alkaline compounds work in combination with the oxygen to give a higher degree of detackification than that achievable with oxygen alone. Operating parameters are similar to those of the first embodiment. This combination can be used when a higher degree of detackification is required and when the appropriate alkaline compound(s) are available. These alkaline compounds are selected from the group consisting of sodium hydroxide, sodium sulfide, sodium carbonate, sodium hydrosulfide, ammonium hydroxide, sodium thiosulfate, sodium sulfate, and mixtures thereof. Certain of these alkaline compounds can be obtained by using white liquor (an aqueous solution containing sodium hydroxide and sodium sulfide), oxidized white liquor (an aqueous solution containing sodium thiosulfate and/or sodium sulfate), or green liquor (an aqueous solution containing sodium sulfide and sodium carbonate) in the reactor during contacting with oxygen. The general term oxidized white liquor includes both partially and fully oxidized white liquor; partially oxidized white liquor contains both thiosulfate and sulfate, while fully oxidized white liquor contains only the sulfate. Other alkaline compounds can be used if desired. It has been found that oxidized white liquor, preferably fully oxidized, is unexpectedly better than other types of alkaline compounds and is the preferred alkali for detackification when available. The alkaline compounds are added to the pulp at a dose between about 0.1 and 15 lb per 100 lbs of dry pulp, preferably between about 0.5 and 5 lb per 100 lbs of dry pulp.

A third embodiment of the invention is an extension of the second embodiment described above. In this third embodiment one or more detackification agents are added to the pulp following the treatment with oxygen and alkali to give further reduction of stickies. This embodiment may be appropriate with certain types of stickies and furnishes in which a high degree of detackification is needed but fiber damage must be minimized and pulp yield maximized. In such cases, the use of detackification agents complements the use of oxygen and alkali and renders the detackification process more flexible. Detackification agents can be selected from the group consisting of ethoxylated surfactants, polyvinyl alcohol (PVOH), acetylenic surfactants, ionic surfactants, talc, clay and mixtures of these agents, and are used at doses of between about 1 and 10,000 parts per million (ppm) by weight based on dry pulp. The pulp is maintained at a temperature between about 20° and 150° C., preferably between about 20° and 80° C., when these agents are added.

A fourth embodiment of the invention is an extension of the first embodiment described above. In this fourth embodiment one or more detackification agents are added to the pulp following the treatment with oxygen to give further reduction of stickies; alkali is not used. This embodiment may be appropriate with certain types of stickies and furnishes in which a high degree of detackification is needed but fiber damage must be minimized and pulp yield maximized. In such a case, the use of detackification agents complements the use of oxygen and renders the detackificatuon process more flexible. Detackification agents, doses, and temperatures are selected as described above in the third embodiment.

The invention also includes a low-grade recycled paper product made by the process of the present invention, wherein the term low-grade paper product includes but is not limited to low-grade corrugated media, inner plies of cardboard, molded products such as trays and cartons, and tubestock. These low-grade papers have the appropriate strengths for specific uses, but appearance is not important so that high brightness and optical homogeneity are not necessary. The invention also includes a high-grade recycled paper product made by the process of the present invention, wherein the term high-grade paper product includes but is not limited to newsprint, towel, tissue, printing paper, and writing paper. In these products, appearance is critical and high brightness and optical homogeneity are required.

A series of laboratory experiments was carried out to quantify and compare various treatment steps for the reduction in tackiness of two typical adhesive materials which are precursors to typical stickies found in secondary pulps. These experiments are summarized in the following Examples.

EXAMPLE 1

Paper coupons were coated with vinyl acetate-acrylate-pressure-sensitive adhesive. One group of coupons was immersed in tap water at ambient conditions for 10 minutes. A second group of coupons was immersed for 10 minutes at ambient conditions in water containing dissolved NaOH at 5.0 g/l. A third group of coupons was immersed at ambient conditions for 10 minutes in water containing 5 wt % NaOH and 2.0 wt % of sodium sulfate to simulate fully oxidized white liquor. Selected coupons were placed on a tray rack in a reactor pressurized to 90 psig with either water-saturated oxygen or water-saturated nitrogen. The coupons were held in the reactor for 45 min at either 85° C. or 130° C., removed therefrom, and air-dried. Several of the coupons which had been immersed in the caustic or white liquor solutions and held in the reactor pressurized with nitrogen or oxygen were further treated by immersion for 45 minutes at 80° C. in virgin pulp filtrate, which is the liquor contained in kraft pulp after washing prior to oxygen delignification. This liquor typically contains about 1.0 wt % lignin an wood cellulose components and has a pH of about 9. To this virgin pulp filtrate was added 40 ppm by weight of a detackification agent selected from PVOH 540 (a high molecular weight polyvinyl alcohol sold by Air Products and Chemicals, Inc.), Surfynol 485 (an acetylene surfactant sold by Air Products and Chemicals. Inc.), and nonyl ethoxylate (a nonyl ethoxylated glycol type surfactant sold by Union Carbide Corporation). Two of the original coated coupons were immersed similarly in virgin pulp filtrate but were not treated with detackification agents and served as controls. All coupons were then rinsed with water and air-dried.

These treated coupons and one of the original coated coupons were then tested for tackiness using a Polykem Series 400 probe tack tester. Each coupon was placed tacky side down on the surface of a flat annular ring and a standard flat weight of 10 grams was placed atop the coupon, pressing it against the ring. A piston with a flat face was raised through the center of the annular ring and contacted with the tacky surface of the coupon. The piston was then lowered and the force necessary to separate the piston surface from the tacky coupon was measured and the tackiness in grams/cm$^2$ was calculated. This was repeated 10 times and the average determined for each coupon. The results of these tests are summarized in Table 1.

The remaining coated coupons were used as controls or were treated at temperatures of 30°–85° C. and 45 minutes contact time with detackification agents at 40 ppm by weight dissolved in virgin pulp filtrate. Tackiness was measured for each coupon using the Polykem probe tack tester as above. The results of these tests are summarized In Table 2.

TABLE 1

TACKINESS OF TREATED AND UNTREATED VINYL ACETATE-ACRYLATE COATED PAPER COUPONS

| | Initial Treatment | | | | | Final Treatment | | |
|---|---|---|---|---|---|---|---|---|
| Sample | Tap Water | NaOH Solution | Oxidized White Liquor Solution | Reactor Conditions Gas | Temperature, °C. | Virgin Pulp Filtrate | Detackifier | Tackiness, g/cm$^2$ |
| Original 1 | — | — | — | — | — | — | — | 521 |
| Control 1 | — | — | — | Air(1) | 25 | yes | — | 498 |
| Control 2 | — | — | — | N$_2$ | 85 | yes | — | 381 |
| 1 | yes | — | — | N$_2$ | 130 | — | — | 356 |
| 2 | — | yes | — | N$_2$ | 85 | — | — | 190 |
| 3 | — | yes | — | N$_2$ | 130 | — | — | 160 |
| 4 | — | yes | — | N$_2$ | 85 | yes | PVOH 540 | 150 |
| 5 | — | yes | — | N$_2$ | 130 | yes | PVOH 540 | 144 |
| 6 | yes | — | — | O$_2$(1) | 25 | — | — | 298 |
| 7 | yes | — | — | O$_2$(2) | 130 | — | — | 123 |
| 8 | yes | — | — | O$_2$ | 130 | — | — | 124 |
| 9 | — | yes | — | O$_2$ | 85 | — | — | 114 |
| 10 | — | yes | — | O$_2$ | 130 | — | — | 113 |
| 11 | — | yes | — | O$_2$ | 130 | yes | PVOH 540 | 99 |
| 12 | — | yes | — | O$_2$ | 130 | yes | Surfynol 485 | 100 |
| 13 | — | yes | — | O$_2$ | 130 | yes | Nonyl Ethoxylate | 92 |
| 14 | — | — | yes | O$_2$ | 130 | — | — | 58 |
| 15 | — | — | yes | O$_2$(2) | 130 | — | — | 57 |
| 16 | — | — | yes | O$_2$ | 130 | yes | PVOH 540 | 54 |
| 17 | — | — | yes | O$_2$ | 130 | yes | Surfynol 485 | 47 |
| 18 | — | — | yes | O$_2$(2) | 130 | yes | Surfynol 485 | 46 |

(1)Atmosphere pressure; reactor residence time 3 min.
(2)Reactor residence time 60 min.

TABLE 2

TACKINESS OF TREATED AND UNTREATED VINYL ACETATE-ACRYLATE COATED PAPER COUPONS

| | Detackification Treatment | | |
|---|---|---|---|
| Sample | Detackifier | Temperature, °C. | Tackiness, g/cm$^2$ |
| Original 2 | — | — | 523 |
| Control 3 | — | 30 | 400 |
| Control 4 | — | 60 | 335 |
| Control 5 | — | 85 | 389 |
| 19 | PVOH 540 | 30 | 228 |
| 20 | PVOH 540 | 60 | 153 |
| 21 | PVOH 540 | 85 | 203 |
| 22 | Surfynol 485 | 60 | 180 |
| 23 | Surfynol 485 | 85 | 204 |
| 24 | Nonylphenol Ethoxylate | 60 | 166 |
| 25 | Nonylphenol Ethoxylate | 85 | 199 |
| 26 | Dodecylphenol Ethoxylate | 60 | 196 |
| 27 | Dodecylphenol Ethoxylate | 85 | 202 |

The results of these tests confirm that these detackification agents alone reduce tackiness as expected. It appears that 60° C. is the optimum temperature for detackification of vinyl acetate-acrylate with these agents. The use of hot caustic solution alone is somewhat more effective for detackification than the detackification agents at the test conditions. The use of oxygen alone at higher temperatures is surprisingly more effective, and when combined with caustic and detackification agents is even more effective at reducing tackiness.

Unexpectedly, the most effective detackification was achieved by the combined use of oxidized white liquor, oxygen, and a detackification agent, which reduced tackiness to 58 g/cm² or less.

EXAMPLE 2

Paper coupons were coated with styrene-butadiene rubber pressure-sensitive adhesive, and detackification tests were performed on these coupons using the procedures of Example 1. The results of these tests are summarized in Tables 3 and 4 and lead to the same conclusions as in Example 1. For styrene-butadiene rubber pressure-sensitive adhesive, the use of oxygen and oxidized white liquor surprisingly yielded no measurable tackiness, and would be the preferred detackification method for this type of adhesive.

TABLE 3
TACKINESS OF TREATED AND UNTREATED STYRENE-BUTADIENE RUBBER COATED PAPER COUPONS

| Sample | Initial Treatment | | | | | Final Treatment | | Tackiness, g/cm² |
|---|---|---|---|---|---|---|---|---|
| | Tap Water | NaOH Solution | Oxidized White Liquor Solution | Reactor Conditions Gas | Temperature, °C. | Virgin Pulp Filtrate | Detackifier | |
| Original | — | — | — | — | — | — | — | 505 |
| Control 1 | — | — | — | N₂(1) | 85 | yes | — | 231 |
| 1 | yes | — | — | N₂ | 130 | — | — | 356 |
| 2 | — | yes | — | N₂ | 85 | — | — | 156 |
| 3 | — | yes | — | N₂ | 130 | — | — | 119 |
| 4 | — | yes | — | N₂ | 85 | yes | PVOH 540 | 125 |
| 5 | — | yes | — | N₂ | 130 | yes | PVOH 540 | 96 |
| 6 | — | yes | — | O₂ | 130 | — | — | 64 |
| 7 | — | yes | — | O₂ | 130 | yes | PVOH 540 | 64 |
| 8 | — | yes | — | O₂ | 130 | yes | Surfynol 485 | 36 |
| 9 | — | yes | — | O₂(1) | 130 | yes | Surfynol 485 | 36 |
| 10 | — | — | yes | O₂(1) | 130 | — | — | 0 |
| 11 | — | — | yes | O₂(1) | 130 | yes | Surfynol 485 | 0 |
| 12 | — | — | yes | O₂(1) | 130 | yes | Surfynol 485 | 0 |

(1) Reactor residence time 60 min.

TABLE 4
TACKINESS OF TREATED AND UNTREATED STYRENE-BUTADIENE COATED PAPER COUPONS

| Sample | Detackification Treatment | | Tackiness, g/cm² |
|---|---|---|---|
| | Detackifier | Temperature, °C. | |
| Original 1 | — | — | 505 |
| Control 2 | — | 30 | 405 |
| Control 3 | — | 60 | 314 |
| 13 | PVOH 540 | 30 | 242 |
| 14 | PVOH 540 | 60 | 205 |
| 15 | Surfynol 485 | 60 | 185 |
| 16 | Nonylphenol Ethoxylate | 60 | 204 |
| 17 | Dodecylphenol Ethoxylate | 60 | 225 |

EXAMPLE 3

Coupons coated with vinyl acetate-acrylate of Example 1 were pulped in a laboratory pulper and the pulp was visually and qualitatively observed. Dispersed clumps of sticky polymer material and fibers in the pulp were physically probed and these stickies were qualitatively determined to be highly tacky. One portion of the pulp was then processed in a laboratory reactor at 10% consistency using NaOH at a dose of 5 wt % on pulp under 90 psig nitrogen pressure at 130° C. for 60 minutes. The pulp was mixed in the reactor at 800 RPM once every 10 minutes. Another portion of the pulp was processed in the same manner using oxygen instead of nitrogen. The third portion of the pulp was not treated. The three pulp samples were then made into individual handsheets for qualitative testing and inspection. The first handsheet, made from the untreated pulp, contained large clumps of tacky polymer and fiber, and when pressed between two sheets of blotter paper the handsheet exhibited significant tackiness. The second handsheet, made from the pulp treated under a nitrogen atmosphere, contained highly-dispersed particles of partially hardened and detackified particles of previously sticky material. This sheet appeared darker than the first handsheet because of the dispersed and partially detackified particles. When pressed between two sheets of blotter paper, this sheet exhibited much less tackiness than the first sheet, but still retained some tackiness. The third handsheet, made from the pulp treated with oxygen, contained dispersed, hardened, detackified particles which were separated from the fiber. In addition, the fiber was significantly brightened compared with the first two handsheets. When pressed between two sheets of blotter paper, the third handsheet exhibited almost no tackiness.

EXAMPLE 4

Coupons coated with styrene-butadiene rubber of Example 2 were subjected to the same procedures of Example 3. Visual and qualitative observations led to the same conclusions reached In Example 3, and demonstrated that treatment of pulp containing styrene-butadiene rubber stickies can be effectively detackified by the process of the present invention.

EXAMPLE 5

Additional tests at various conditions were carried out according to the initial treatment steps of Example 1 using test coupons coated with vinyl acetate-acrylate. The tests utilized oxygen, nitrogen, and air for reactor pressurization, and compared sodium hydroxide with white liquor and oxidized white liquor as alkali sources. The results as given in Table 5 show that oxygen alone is an effective detackifier, and that the preferred alkali source for additional detackification is fully oxidized white liquor.

TABLE 5
TACKINESS OF TREATED VINYL ACETATE-ACRYLTE COATED PAPER COUPON

| Gas | Alkali | T, °C. | P, Psig | Retention Time, min. | Tackinss, g/cm² |
|---|---|---|---|---|---|
| Untreated | | — | — | — | 521 |
| Air | — | 25 | 14.7 | 3 | 498 |
| Air | NaOH | 25 | 14.7 | 3 | 205 |

TABLE 5-continued
TACKINESS OF TREATED VINYL ACETATE-ACRYLTE COATED PAPER COUPON

| Gas | Alkali | T, °C. | P, Psig | Retention Time, min. | Tackinss, g/cm² |
|---|---|---|---|---|---|
| Air | WL(1) | 25 | 14.7 | 3 | 198 |
| Air | OWL,T(2) | 25 | 14.7 | 3 | 208 |
| Air | OWL,S(3) | 25 | 14.7 | 3 | 198 |
| $O_2$ | — | 25 | 14.7 | 3 | 295 |
| $O_2$ | NaOH | 25 | 14.7 | 3 | 161 |
| $O_2$ | WL | 25 | 14.7 | 3 | 134 |
| $O_2$ | OWL,T | 25 | 14.7 | 3 | 137 |
| $O_2$ | OWL,S | 25 | 14.7 | 3 | 129 |
| Air | — | 85 | 90 | 45 | 381 |
| $N_2$ | NaOH | 85 | 90 | 45 | 190 |
| $O_2$ | — | 85 | 90 | 45 | 156 |
| $O_2$ | NaOH | 85 | 90 | 45 | 114 |
| Air | — | | | | 356 |
| Air | NaOH | 130 | 90 | 45 | 125 |
| Air | WL | 130 | 90 | 45 | 141 |
| Air | OWL,T | 130 | 90 | 45 | 153 |
| Air | OWL,S | 130 | 90 | 45 | 125 |
| $N_2$ | — | 130 | 90 | 45 | 356 |
| $N_2$ | NaOH | 130 | 90 | 45 | 160 |
| $N_2$ | WL | 130 | 90 | 45 | 123 |
| $N_2$ | OWL,T | 130 | 90 | 45 | 109 |
| $N_2$ | OWL,S | 130 | 90 | 45 | 103 |
| $O_2$ | — | 130 | 90 | 45 | 124 |
| $O_2$ | NaOH | 130 | 90 | 45 | 113 |
| $O_2$ | WL | 130 | 90 | 45 | 93 |
| $O_2$ | OWL,T | 130 | 90 | 45 | 84 |
| $O_2$ | OWL,S | 130 | 90 | 45 | 57 |

(1)WL — White liquor
(2)OWL,T — partially oxidized white liquor
(3)OWL,S — fully oxidized white liquor

EXAMPLE 6

Laser printed ledger paper was pulped in a laboratory reactor with water for 15 minutes and a portion of the pulp was made into a handsheet. The sheet contained large numbers of small specks of laser printed ink and had a measured brightness (Tappi T 217 wd-71) of 77.5. The specks were too small to physically characterize as sticky or tacky, but laser printed ink is known to deposit on pulp processing equipment in secondary fiber recovery. Two portions of the remaining pulp were treated individually in a laboratory reactor under either a nitrogen (as a control) or an oxygen atmosphere at 90 psig and 130° C. for 60 minutes. The pulp was mixed at 800 RPM every 10 minutes. Pulp samples were removed from the reactor and each was screened through a six-cut Sommerville vibrating screen with slots 0.15 mm wide and 45 mm long. Handsheets were prepared from each screened pulp sample, qualitatively observed, and tested for brightness. The procedure was repeated with oxygen and with NaOH doses of 5 and 10 wt % on pulp. In addition, another sample was treated at 5 wt % NaOH using a simulated oxidized white liquor which contained 100 g/l NaOH and 40 g/l $Na_2SO_4$. Visual observations of the handsheets showed that the control pulp contacted with nitrogen yielded a darker sheet than the untreated pulp, indicating that the laser ink was further dispersed and the fibers darkened. The oxygen-treated pulps yielded sheets which were almost completely cleaned of ink particles, with an increased brightness. This indicated that the laser-printed ink particles were hardened and agglomerated so that removal by screening was readily accomplished. The use of oxidized white liquor as an alkali source yielded the brightest sheet, and is a preferred alkali in the removal of laser printed ink from secondary pulps by the method of the present invention. Ink removal can be accomplished by oxygen without alkali, but improved brightness is obtained with alkali. It is expected that this method also will remove any type of xerox or electrostatic ink from secondary pulps. A summary of the data from these tests is given in Table 6.

TABLE 6

| | Removal of Laser Printed Ink | | |
|---|---|---|---|
| Gas Used | NaOH Source | NaOH Dose, w % on dry pulp | Brightness |
| Untreated | — | — | 77.5 |
| Nitrogen | — | — | 73.9 |
| Oxygen | — | — | 82.7 |
| Oxygen | NaOH | 5.0 | 83.1 |
| Oxygen | NaOH | 10.0 | 84.6 |
| Oxygen | Oxidized White Liquor | 5.0 | 86.8 |

Application of the detackification methods described in Examples 1–6 illustrate the embodiments of the present invention. The quantitative tests described in Examples 1 and 2 are useful for determining and comparing the effectiveness of detackification methods for various adhesive materials which are the precursors of stickies. Because it is not possible to quantify the actual reduction in tackiness of individual particles or stickies dispersed in pulp on a laboratory scale, the qualitative tests described in Examples 3 and 4 can be useful in estimating the detackification characteristics of new sources of waste paper materials prior to processing for secondary fiber recovery, and also to monitor for quality control purposes the characteristics of waste paper regularly obtained from a specific source.

Thus the embodiments of the present invention are new and useful methods for improving the operation of secondary fiber recovery processes by reducing the problems caused by stickies deposition in the equipment used in these processes. The use of oxygen to detackify an aqueous pulp suspension is a simple, effective, and economical method and in many cases may be the only detackification step needed. It can be more economical in some cases than the use of detackification agents alone, especially if oxygen is already available at a given secondary fiber plant. The use of oxygen or oxygen and alkali can complement the use of detackification agents, and this combination is potentially useful and economical when a high degree of detackification is necessary along with a high pulp recovery and minimum fiber damage.

The essential characteristics of the present invention are described fully and completely in the foregoing disclosure. One skilled in the art can understand the invention and make various changes and modifications thereto without departing from the basic spirit thereof and without departing from the scope and range of equivalents of the claims which follow.

We claim:

1. A method for treating a secondary pulp comprising cellulosic fibers and tacky contaminants, wherein said pulp is prepared from waste paper material, said method comprising contacting said pulp with an aqueous liquid in the presence of oxygen gas at conditions of temperature, oxygen partial pressure, and contact time sufficient to decrease the tackiness of said tacky contaminants, thereby reducing operating and product quality problems caused by said tacky contaminants during further processing of said cellulosic fibers to yield a recycled paper product.

2. The method of claim 1 wherein said contacting is carried out at a temperature between about 25° and 250° C.

3. The method of claim 2 wherein said contacting is carried out at a temperature between about 60° and 130° C.

4. The method of claim 1 wherein said contacting Is carried out at an oxygen partial pressure between about 5 and 450 psig.

5. The method of claim 1 wherein said contacting is carried out a contact time of between about 0.1 and 120 minutes.

6. The method of claim 1 further comprising the addition of one or more detackification agents to said pulp following said contacting with oxygen-containing gas.

7. The method of claim 6, wherein said one or more detackification agents are selected from the group consisting of ethoxylated surfactants, polyvinyl alcohol (PVOH), acetylenic surfactants, ionic surfactants, talc, clay and mixtures thereof.

8. The method of claim 6, wherein said one or more detackification agents are added to said pulp in a total amount ranging between about 1 and 10,000 ppm by weight based on pulp.

9. A method for treating a secondary pulp comprising ellulosic fibers and tacky contaminants, wherein said pulp is prepared from waste paper material and water, said method consisting essentially of comminuting and dispersing said waste paper material in water to form said secondary pulp, and contacting said pulp with oxygen gas at conditions of oxygen partial pressure, temperature, and contact time sufficient to decrease the tackiness of said tacky contaminants, thereby reducing operating and product quality problems caused by said tacky contaminants during further processing of said cellulosic fibers to yield a recycled paper product.

10. A method for treating a secondary pulp comprising cellulosic fibers and tacky contaminants, wherein said pulp is prepared from waste paper material and water, said method consisting essentially of comminuting and dispersing said waste paper material in water to form said secondary pulp, and contacting said pulp with oxygen gas and one or more detackification agents at conditions of oxygen partial pressure, temperature, and contact time sufficient to decrease the tackiness of said tacky contaminants, thereby reducing operating and product quality problems caused by said tacky contaminants during further processing of said cellulosic fibers to yield a recycled paper product.

11. The method of claim 10 wherein said one or more detackification agents are selected from the group consisting of ethoxylated surfactants, polyvinyl alcohol (PVOH), acetylenic surfactants, ionic surfactants, talc, clay, and mixtures thereof.

12. The method of claim 11 wherein said one or more detackification agents are added to said pulp in a total amount ranging from 1 to 10,000 ppm by weight based on pulp.

* * * * *